US008845930B2

(12) United States Patent
Pipko et al.

(10) Patent No.: US 8,845,930 B2
(45) Date of Patent: Sep. 30, 2014

(54) METHODS OF PREVENTING CORROSION

(75) Inventors: Gregory Pipko, Katzrin (IL); Zvi Miller, Kiryat Tivon (IL)

(73) Assignee: Pigmentan Ltd., Ramat Gan (IL)

( * ) Notice: Subject to any disclaimer, the term of this patent is extended or adjusted under 35 U.S.C. 154(b) by 1480 days.

(21) Appl. No.: 11/791,797

(22) PCT Filed: Nov. 28, 2005

(86) PCT No.: PCT/IL2005/001267
§ 371 (c)(1),
(2), (4) Date: Apr. 21, 2008

(87) PCT Pub. No.: WO2006/056996
PCT Pub. Date: Jun. 1, 2006

(65) Prior Publication Data
US 2009/0020186 A1  Jan. 22, 2009

Related U.S. Application Data

(60) Provisional application No. 60/631,181, filed on Nov. 29, 2004.

(51) Int. Cl.
| | |
|---|---|
| C09K 3/00 | (2006.01) |
| C02F 5/02 | (2006.01) |
| C09K 5/00 | (2006.01) |
| C09K 5/04 | (2006.01) |
| C09K 15/32 | (2006.01) |
| C02F 5/08 | (2006.01) |
| C23F 14/02 | (2006.01) |
| C02F 5/10 | (2006.01) |
| C23G 1/06 | (2006.01) |
| C04B 9/02 | (2006.01) |
| C09K 5/10 | (2006.01) |
| C04B 28/02 | (2006.01) |
| C09D 5/08 | (2006.01) |
| C23F 11/167 | (2006.01) |
| C04B 40/00 | (2006.01) |
| C04B 111/26 | (2006.01) |
| C04B 103/61 | (2006.01) |

(52) U.S. Cl.
CPC ............ *C04B 28/02* (2013.01); *C04B 2111/26* (2013.01); *C04B 2103/61* (2013.01); *C09K 5/10* (2013.01); *C09D 5/086* (2013.01); *C23F 11/167* (2013.01); *C04B 40/0042* (2013.01)
USPC .................. 252/387; 252/389.2; 252/389.22; 252/389.23; 252/181; 252/68; 252/69; 252/400.2; 252/400.22; 510/247; 510/253; 510/264; 510/265; 106/14.12; 106/14.15; 106/14.16

(58) Field of Classification Search
USPC ............ 252/387, 389.2, 389.22, 389.23, 181, 252/68, 69, 400.2, 400.22; 510/247, 253, 510/264, 265; 106/14.12, 14.15, 14.16
See application file for complete search history.

(56) References Cited

U.S. PATENT DOCUMENTS

| | | | | |
|---|---|---|---|---|
| 2,261,293 | A * | 11/1941 | Samans | 422/200 |
| 3,146,208 | A * | 8/1964 | Fisher | 510/259 |
| 3,809,152 | A * | 5/1974 | Boehmer | 165/51 |
| 3,960,611 | A | 6/1976 | Walker | |
| 4,294,621 | A | 10/1981 | Maurer | |
| 4,740,393 | A | 4/1988 | Cody | |
| 4,946,595 | A | 8/1990 | Miller, Jr. | |
| 5,080,818 | A * | 1/1992 | Tachiiwa et al. | 252/75 |
| 5,126,074 | A | 6/1992 | Bittner | |
| 5,326,389 | A | 7/1994 | Cambon | |
| 5,665,149 | A | 9/1997 | Gotzmann | |
| 6,139,610 | A * | 10/2000 | Sinko | 106/14.44 |
| 6,139,616 | A | 10/2000 | Nagayama | |
| 6,296,881 | B1 * | 10/2001 | Hata et al. | 424/647 |
| 6,331,202 | B1 | 12/2001 | Pipko | |
| 6,503,305 | B1 | 1/2003 | Hodges | |
| 2003/0034479 | A1 | 2/2003 | Marazzani | |
| 2004/0168614 | A1 | 9/2004 | Pipko | |
| 2007/0012220 | A1 | 1/2007 | Matsuda | |
| 2008/0020145 | A1 | 1/2008 | Pipko | |

FOREIGN PATENT DOCUMENTS

| | | | |
|---|---|---|---|
| EP | 0299942 | 1/1989 | |
| FR | 2564478 | 11/1985 | |
| IL | 180093 | 5/2007 | |
| JP | 60240778 | 11/1985 | |
| JP | 01-030997 | * 2/1989 | F16L 58/10 |
| JP | 1311186 | 12/1989 | |
| WO | WO 02/099002 | * 12/2002 | |

OTHER PUBLICATIONS

ACROS MSDS 2004 {http://www.chemcas.org/drug/analytical/cas/q849000.asp}.*
ENDO Gulf Company MSDS Diethanolamine {http://www.indogulfgroup.com/MSDS/DIETHANOLAMINE-.pdf}.*
International Search Report and Written Opinion issued for PCT/IL2005/001267 on Aug. 8, 2006.
European Search Report issued for 05813134.3 on Dec. 16, 2010.

* cited by examiner

*Primary Examiner* — Patrick Ryan
*Assistant Examiner* — Aaron Greso
(74) *Attorney, Agent, or Firm* — Roach Brown McCarthy & Gruber, P.C.; Kevin D. McCarthy

(57) ABSTRACT

The invention provides a method for pre-treating a metal surface with a corrosion inhibitor prior to painting, a method for inhibiting corrosion in a cooling system, wherein the cooling system includes a metal surface and a coolant; and a method for inhibiting corrosion of a reinforcement steel in concrete wherein the method comprising the step of adding to a concrete mixture an anti-corrosive mixture.

6 Claims, No Drawings

METHODS OF PREVENTING CORROSION

CROSS-REFERENCE TO RELATED APPLICATIONS

This application is a National Phase Application of PCT International Application No. PCT/IL2005/001267, International Filing Date Nov. 28, 2005, claiming priority of U.S. Provisional Patent Application No. 60/631,181, filed Nov. 29, 2004, all which are incorporated herein by reference in their entirety.

FIELD OF THE INVENTION

The invention provides a method for pre-treating a metal surface with a corrosion inhibitor prior to painting, a method for inhibiting corrosion in a cooling system, wherein the cooling system includes a metal surface and a coolant; and a method for inhibiting corrosion of a reinforcement steel in concrete wherein the method comprising the step of adding an anti-corrosive mixture to a concrete mixture.

BACKGROUND OF THE INVENTION

Every year about 5% of iron products worldwide are being replaced due to corrosion. Various coating methods are used to reduce the corrosion damage, most of which methods are based on applying paints. The corrosion protective element in paints is generally a corrosion inhibitor based on chromates. These corrosion inhibitors usually include heavy metals salts, which hinder the corrosion of the metal surface. Zinc compounds such as zinc phosphate and zinc chromate are currently widely used as corrosion inhibitors. Zinc is a heavy metal element and is considered to be toxic at certain concentrations.

Furthermore, the damaging effects of corrosion on cooling systems cause an equipment failure and loss of system efficiency, which can be even more costly over time. Conventional cooling water corrosion inhibitors such as zinc, chromate, molybdate and nitrites are all toxic to the environment and in most cases damaging to human health. Due to the growing awareness of the environmental damage associated with heavy metal products, there is an industrial need for effective corrosion inhibitor coating methods based on non heavy metals, non-toxic agents.

Steel corrosion in reinforced concrete structures has been a major problem across the U.S. Steel-reinforced concrete structures are continually subject to attack by corrosion brought on by naturally occurring environmental conditions such as carbonation and the introduction of chlorides from sources such as salt water, deicing salts, and accelerating admixtures.

SUMMARY OF THE INVENTION

In one embodiment, this invention provides a method for pre-treating a metal surface with a corrosion inhibitor prior to painting, the method includes, typically, a step of contacting the metal surface with a mixture including, typically, an organic amine, a phosphoric acid and/or an inorganic phosphate and a metal oxide and/or a metal hydroxide, wherein a layer comprising said corrosion inhibitor is formed on the metal surface, thereby pre-treating the metal surface with the corrosion inhibitor.

Furthermore, in another embodiment, this invention provides a method for inhibiting corrosion in a cooling system, wherein the cooling system includes typically, a metal surface and a coolant, including, typically, the step of contacting a mixture including, typically, an organic amine, a phosphoric acid and/or an inorganic phosphate and a metal oxide and/or a metal hydroxide, with a coolant, thereby inhibiting corrosion in the cooling system.

In one embodiment, this invention provides a method for inhibiting corrosion of a reinforcement steel in concrete, wherein the method comprising a step of adding an anti-corrosive mixture to a concrete mixture comprising, typically an organic amine, a phosphoric acid and/or inorganic phosphate; and a metal oxide and/or a metal hydroxide, thereby inhibiting corrosion of the reinforcement steel in concrete.

DETAILED DESCRIPTION OF THE INVENTION

In one embodiment, this invention provides a method for pre-treating a metal surface with a corrosion inhibitor prior to painting, the method includes, typically, the step of contacting the metal surface with a mixture including, typically, an organic amine, a phosphoric acid and/or an inorganic phosphate and a metal oxide and/or a metal hydroxide, wherein a layer comprising said corrosion inhibitor is formed on the metal surface, thereby pre-treating the metal surface with the corrosion inhibitor.

In one embodiment of the invention, the organic amine and the phosphoric acid and/or inorganic phosphate may react to form an organic phosphate.

In one embodiment of the invention, the organic phosphate may react with the metal oxide and/or metal hydroxide to form oxyaminophosphate. In another embodiment, the oxyaminophosphate is an oxyaminophosphate of a metal. In another embodiment, the metal magnesium.

In one embodiment of the invention, the mixture may include, typically, 0.2-5% of oxyaminophosphate. In another embodiment, the mixture may include, typically, 0.2-0.5% of oxyaminophosphate. In another embodiment, the mixture may include, typically, 0.5-1% of oxyaminophosphate. In another embodiment, the mixture may include, typically, 1-3% of oxyaminophosphate. In another embodiment, the mixture may include, typically, 3-5% of oxyaminophosphate. In another embodiment, the mixture may include, typically, 3% of oxyaminophosphate.

In another embodiment of the invention, the oxyaminophosphate is obtained by adding phosphoric acid and/or inorganic phosphate (4-20%) to water (60-80%) containing an organic amine (2-10%) and then adding metal oxide and/or metal hydroxide (6-25%). In another embodiment, 4-10% of phosphoric acid and/or inorganic phosphate are added to water. In another embodiment, 5-15% of phosphoric acid and/or inorganic phosphate are added to water. In another embodiment, the water contains 2-5% of organic amine. In another embodiment, the water contains 3-7% of organic amine. In another embodiment, 6-10% of metal oxide and/or metal hydroxide are added to the water. In another embodiment, 10-15% of metal oxide and/or metal hydroxide are added to the water. In another embodiment, 15-25% of metal oxide and/or metal hydroxide are added to the water.

In one embodiment of the invention, the organic amine may be, typically, a quaternary amine. In another embodiment, the organic amine may be, typically, morpholine, dicyclohexylamine, ethanolamine, an aliphatic amine, an aromatic amine, melamine, hexamethylentetramine, pentamethylentetramine or any combination thereof. In another embodiment, the ethanolamine may be mono, di or tri ethanolamine, or any combination thereof.

In one embodiment of the invention, the compound selected from the group consisting of a metal oxide and a metal hydroxide may be formed in solution by adding a base to a metal salt solution.

In one embodiment of the invention, the metal of the metal oxide and/or metal hydroxide may be, typically, magnesium, calcium, iron, zinc, molybdenum, aluminum or any combination thereof. In another embodiment, the metal may be, typically, magnesium. In another embodiment, the metal oxide may be, typically, MgO. In another embodiment, the metal hydroxide may be, typically, $Mg(OH)_2$.

In one embodiment of the invention, the mixture may be, typically, a solution, emulsion suspension or slurry or granulated substance. In another embodiment, the mixture may be, typically, an aqueous mixture.

In one embodiment of the invention, the corrosion inhibitor forms a metal oxide and/or metal hydroxide layer onto the metal surface. In another embodiment the layer may be between 1-100 nm (nanometer). In another embodiment, the thickness of the layer may be between 5-60 nm. In another embodiment, the thickness of the layer may be between 10-50 nm. In another embodiment, the thickness of the layer may be between 10-20 nm In one embodiment of the invention, the metal surface may include, typically iron, magnesium, aluminum, copper, zinc or any combination thereof. In another embodiment, the metal surface may include, typically, a metal alloy.

In one embodiment of the invention, the mixture may further include, typically, surface active agent, anti-corrosive agents, bactericides, colorants, or a combination thereof.

Furthermore, in another embodiment, this invention provides a method for inhibiting corrosion in a cooling system, wherein the cooling system includes a metal surface and a coolant, including the step of contacting a mixture including, typically an organic amine, a phosphoric acid and/or an inorganic phosphate and a metal oxide and/or a metal hydroxide, with the coolant, thereby inhibiting corrosion in the cooling system.

In one embodiment of the invention, the coolant comprises gas. In another embodiment of the invention, the coolant is a liquid coolant. In another embodiment, the liquid coolant is a water-based coolant. In another embodiment, the coolant is used to carry heat away from the system. In another embodiment, the water may be, typically, demineralized water, salinated water, fresh water, treated water or any combination thereof. In another embodiment, the water-based coolant may further include an antifreeze material. In another embodiment, the antifreeze may be, typically ethylene glycol, propylene glycol or any combination thereof. In another embodiment, the salt concentration of the salinated water is 0.1-5%. In another embodiment, the salt concentration of the salinated water is 0.1-0.5%. In another embodiment, the salt concentration of the salinated water is 0.1-1%. In another embodiment, the salt concentration of the salinated water is 0.5-1%. In another embodiment, the salt concentration of the salinated water is 1-3%. In another embodiment, the salt concentration of the salinated water is 3-5%.

In one embodiment of the invention, the water-based coolant includes 90-100% water. In another embodiment, the water-based coolant includes 80-90% water. In another embodiment, the water-based coolant includes 50-70% water.

In one embodiment of the invention, the organic amine and the phosphoric acid and/or inorganic phosphate may react to form an organic phosphate.

In one embodiment of the invention, the organic phosphate may react with the metal oxide and/or metal hydroxide to form oxyaminophosphate. In another embodiment, the oxyaminophosphate is an oxyaminophosphate of a metal. In another embodiment, the metal magnesium.

In one embodiment of the invention, the mixture may include, typically, 5-500 ppm of oxyaminophosphate. In another embodiment, the mixture may include, typically 5-25 ppm of oxyaminophosphate. In another embodiment, the mixture may include, typically, 25-50 ppm of oxyaminophosphate. In another embodiment, the mixture may include, typically, 50-200 ppm of oxyaminophosphate. In another embodiment, the mixture may include, typically, 100-300 ppm of oxyaminophosphate.

In another embodiment of the invention, the oxyaminophosphate is obtained by adding phosphoric acid and/or inorganic phosphate (4-20%) to water (60-80%) containing an organic amine (2-10%) and then adding metal oxide and/or metal hydroxide (6-25%). In another embodiment, 4-10% of phosphoric acid and/or inorganic phosphate are added to water. In another embodiment, 5-15% of phosphoric acid and/or inorganic phosphate are added to water. In another embodiment, the water contains 2-5% of organic amine. In another embodiment, the water contains 3-7% of organic amine. In another embodiment, 6-10% of metal oxide and/or metal hydroxide are added to the water. In another embodiment, 10-15% of metal oxide and/or metal hydroxide are added to the water. In another embodiment, 15-25% of metal oxide and/or metal hydroxide are added to the water.

In one embodiment of the invention, the organic amine may be, typically, a quaternary amine. In another embodiment, the organic amine may be, typically, morpholine, dicyclohexylamine, ethanolamine, an aliphatic amine, an aromatic amine, melamine, hexamethylentetramine, pentamethylentetramine or any combination thereof. In another embodiment, the ethanolamine may be mono, di or tri ethanolamine, or any combination thereof.

In one embodiment of the invention, the compound selected from the group consisting of a metal oxide and a metal hydroxide may be formed in solution by adding a base to a metal salt solution.

In one embodiment of the invention, the metal of the metal oxide and/or metal hydroxide may be, typically, magnesium, calcium, iron, zinc, molybdenum, aluminum or any combination thereof. In another embodiment, the metal may be, typically, magnesium. In another embodiment, the metal oxide may be, typically, MgO. In another embodiment, the metal hydroxide may be, typically, $Mg(OH)_2$.

In one embodiment of the invention, the mixture may be, typically, a solution, emulsion suspension or slurry or granulated substance. In another embodiment, the mixture may be typically, an aqueous mixture.

In one embodiment of the invention, the corrosion inhibitor forms a metal oxide and/or metal hydroxide layer onto the metal surface. In another embodiment the layer may be between 1-100 nm (nanometer). In another embodiment, the thickness of the layer may be between 5-60 nm. In another embodiment, the thickness of the layer may be between 10-50 nm. In another embodiment, the thickness of the layer may be between 10-20 nm In one embodiment of the invention, the metal surface includes, typically, iron, magnesium, aluminum, copper, zinc or any combination thereof. In another embodiment, the metal surface is a metal alloy.

In one embodiment of the invention, the mixture may further include, typically, surface active agent, anti-corrosive agents, bactericides, colorants, or a combination thereof.

According to embodiments of the invention, the term "cooling system" refers to a system utilizing either air or water to remove heat from the engine. In another embodiment, the heat is transferred using a coolant. In another embodiment, the coolant is a liquid.

In one embodiment of the invention, the cooling system may be an open system.

According to embodiments of the invention, the term "open cooling system" refers to a cooling system in which the coolant moves throughout the system and is then discharged. In another embodiment, there is no water circulation in an open cooling system.

In one embodiment of the invention, the cooling system may be a close system.

According to embodiments of the invention, the term "close cooling system" refers to a cooling system in which a self-contained liquid circuit is used continuously for the cooling of the system. In another embodiment of the invention, closed cooling systems may operate at pressures greater than atmospheric pressure. In another embodiment, the increased pressure results in an increased boiling point of the coolant to a temperature that is higher than 212° F.

In one embodiment of the invention, the cooling system may include, typically a pipe, a tube, an engine, a knob, or any combination thereof. In another embodiment, the cooling system may be a radiator.

Furthermore, in another embodiment, this invention provides a method for inhibiting corrosion in a transporting system, wherein the transporting system includes a metal surface and a liquid, wherein the liquid comprises water, including the step of contacting a mixture including, typically, an organic amine, a phosphoric acid and/or an inorganic phosphate and a metal oxide and/or a metal hydroxide, with the liquid, thereby inhibiting corrosion in the transporting system. In another embodiment, the transporting system is a pipe.

Furthermore, in another embodiment, this invention provides a method for inhibiting corrosion in any holding system, wherein the holding system includes a metal surface and a liquid, wherein the liquid comprises water, including the step of contacting a mixture including typically, an organic amine, a phosphoric acid and/or an inorganic phosphate and a metal oxide and/or a metal hydroxide, with the liquid, thereby inhibiting corrosion in the holding system. In another embodiment, the holding system is a tank.

Moreover, in one embodiment, this invention provides a mixture including, typically, an organic amine, a phosphoric acid and/or an inorganic phosphate and a metal oxide and/or a metal hydroxide for inhibiting corrosion, wherein the mixture is added to the water applied in metal processing.

In one embodiment, this invention provides a method for inhibiting corrosion of a reinforcement steel in concrete, wherein the method comprising the step of adding to a concrete mixture an anti-corrosive mixture comprising, typically, an organic amine; a phosphoric acid and/or inorganic phosphate; and a metal oxide and/or a metal hydroxide, thereby inhibiting corrosion of the reinforcement steel in concrete.

In another embodiment the concrete mixture is gravel, sand, water, cement and additives.

In another embodiment, the organic amine is a quaternary amine. In another embodiment, the organic amine is morpholine, dicyclohexylamine, ethanolamine, an aliphatic amine, an aromatic amine, melamine, hexamethylentetramine, pentamethylentetramine or any combination thereof. In another embodiment, the ethanolamine is a mono, di or tri ethanolamine or any combination thereof.

In another embodiment, the metal of the metal oxide and/or metal hydroxide is magnesium, calcium, iron, zinc, molybdenum, aluminum or any combination thereof. In another embodiment, the metal may be, typically, magnesium. In another embodiment, the metal oxide may be, typically, MgO. In another embodiment, the metal hydroxide may be, typically, $Mg(OH)_2$.

In one embodiment of the invention, the mixture may be, typically, a powder, a solution, emulsion suspension or slurry substance.

In one embodiment of the invention, the corrosion inhibitor forms a metal oxide and/or metal hydroxide layer onto the metal surface.

In one embodiment of the invention, the mixture may further include, typically, surface active agent, anti-corrosive agents, bactericides, colorants, or a combination thereof.

It will be appreciated that the present invention is not limited by what has been described hereinabove and that numerous modifications, all of which fall within the scope of the present invention, exist. Rather the scope of the invention is defined by the claims that follow.

EXAMPLES

The following examples, including experiments ans results achieved, are provided for illustrative purposes only and are not to be construed as limited claimed subject matter Example 1

Metal treatment formulation was prepared by suspending the following: two parts powder comprising 20% melamine, 30% phosphoric acid and 50% magnesia (Mgo, $Mg(OH)_2$)

five parts acrylic emulsion 95 parts DI water

Aluminum 2024 T3 panels were cleaned in NaOH solution, washed by DI water and dried.

The panels were treated as follows:

Three panels—without any treatment

Three panels—with the emulsion suspension

Three panels—with the above formulation

After forced drying the panels were put in salt spray chamber according to ASTM B-117.

Corrosion results after 120 hr in salt spray—(corroded area as % of total surface area)

None treated panels—more than 90%

Emulsion treated panels—more than 80%

Formulation treated panels—minimal corrosion.

Example 2

Metal treatment formulation was prepared by suspending the following:

Two parts powder comprising 16% monoethanol amine, 28% phosphoric acid and 56% magnesia (Mgo, $Mg(OH)_2$).

Five parts acrylic emulsion

95% DI water

Al 2024 T3 panels were treated as in Example 1.

Corrosion results after 120 hr in salt spray of the formulation treatment was minimal.

Example 3

The same as Example 1 but instead of NaOH cleaning solution the panels were cleaned with organic solvent and dried.

The corrosion results were similar to Example 1.

Example 4

Metal treatment formula was prepared as in Example 1.

Cold rolled steel panels were cleaned by organic solvent and dried.

The panels were treated as follows:

Three panels—without any treatment

Three panels—with the emulsion suspension

Three panels—with the above formulation

After drying the panels were put in salt spray chamber according to ASTM B-117.

Corrosion results after 120 hr in salt spray—(corroded area as % of total surface area).

Non treated panels—100% of area corroded.

Emulsion treated panels—more than 80%.

Formulation treated panels—Less than 30%.

Example 5

As Example 4, cold rolled steel panels treated with metal treatment formula as in example no 2 (monoethanol amine).

Corrosion results after 120 hr in salt spray of the panels treated with the formula were less than 20% of surface area.

Example 6

Concrete mixture was prepared at the following ratio—cement:water:sand=2:1:3.

Powder comprising 16% monoethanol amine, 28% phosphoric acid and 56% magnesia (Mgo, $Mg(OH)_2$) was added to the concrete mixture at levels of 1%, 2.5%, 5% and 10% by weight.

The concrete samples were dried for 30 days.

The concrete sample were crushed and dipped in 5% NaCl solution at 25° C. for 2 month with cold rolled steel panels.

No corrosion appeared on the panels' surface.

Example 7

Three steel panels were immersed in cooling water containing 200 ppm $Ca(+2)$ 80 ppm $Mg(+2)$ and 250 ppm $Cl(-1)$ 0.3% by weight of the powder of Example 2 was added to the cooling water.

The steel panels remained with no visible corrosion after 2 month dipping in the cooling water.

Example 8

Three Steel panels were immersed in cooling water containing 800 ppm $Ca(+2)$, 200 ppm $Mg(+2)$, 2400 ppm $Cl(-1)$ and 300 ppm $SO4(-2)$ with the same type and level of powder addition as in Example 7.

The panels remained with no visible corrosion after 1 month dipping in these cooling water.

What we claimed is:

1. A method of inhibiting corrosion of metal surfaces in a cooling system using a water-based coolant, the method comprising:
    preparing an oxyaminophosphate by:
        mixing (by weight from the reaction mixture): 60-80% water, 2-10% an organic amine, and 4-20% phosphoric acid and/or inorganic phosphate to form an organic phosphate;
    reacting the formed organic phosphate with 6-25% metal oxide and/or metal hydroxide to form the oxyaminophosphate; and
    drying the oxyaminophosphate; and
    contacting a mixture comprising the dried oxyaminophosphate with the water-based coolant, to form a corrosion protective layer internally on the metal surfaces, consisting of metal oxide and/or metal hydroxide precipitants, wherein the metal is magnesium, wherein the mixture is non-toxic;
    wherein a ratio of the metal oxide and/or metal hydroxide to phosphoric acid and/or inorganic phosphate is between 1:4 and 4:1, causing the formation of the corrosion protective layer through the precipitation of the metal oxide and/or metal hydroxide internally on the metal surfaces, wherein the thickness of said layer is between 1 to 100 nm.

2. The method of claim 1, further comprising removing the water based coolant with the oxyaminophosphate mixture from the cooling system, to yield a non-toxic discharge.

3. A method according to claim 1, wherein the organic amine is melamine.

4. A method according to claim 1, wherein said organic amine is a mono ethanolamine, a di ethanolamine, a tri ethanolamine or any combination thereof.

5. A method according to claim 1, wherein said mixture is a solution, emulsion suspension or slurry or granulated substance.

6. A method according to claim 1, wherein said mixture is an aqueous mixture.

\* \* \* \* \*